May 5, 1970     G. D. FLAITH ET AL     3,509,987

SLAT CONVEYOR ASSEMBLY

Filed May 8, 1968     2 Sheets-Sheet 1

INVENTORS:
GEORGE DONALD FLAITH
EDWARD M. HYDE
BY Howson & Howson
ATTYS.

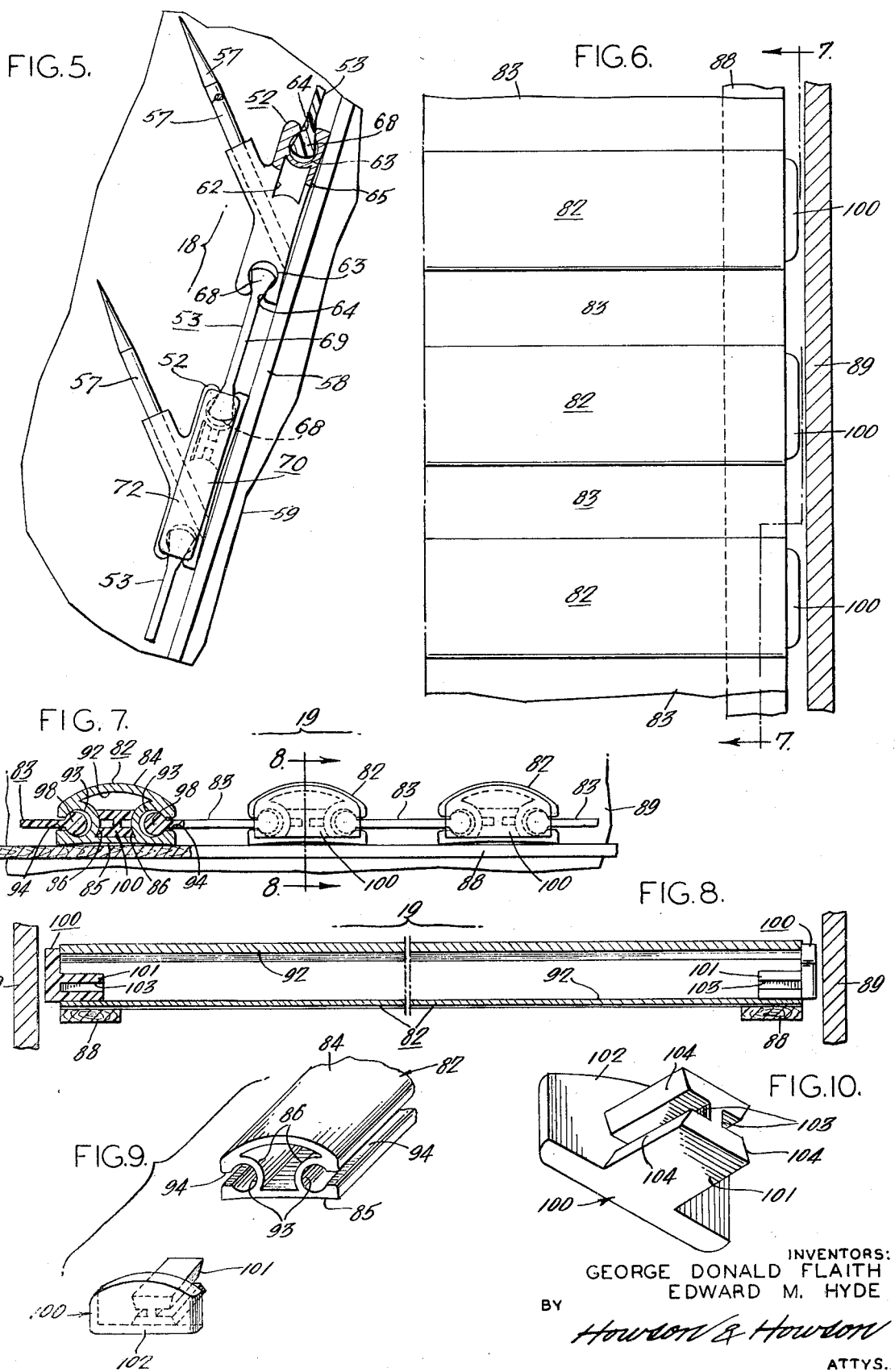

United States Patent Office 3,509,987
Patented May 5, 1970

3,509,987
SLAT CONVEYOR ASSEMBLY
George Donald Flaith, Wyndmoor, and Edward M. Hyde, Lafayette Hill, Pa., assignors to Proctor & Schwartz, Inc., Philadelphia, Pa., a corporation of Pennsylvania
Filed May 8, 1968, Ser. No. 727,413
Int. Cl. B65g 15/52
U.S. Cl. 198—195                              10 Claims

ABSTRACT OF THE DISCLOSURE

A slat conveyor assembly in which metallic slats are interconnected by plastic flexible hinges co-extensive in length with the slats. The slats have a central bore extending longitudinally therethrough and have open ended keyhole-shaped edge grooves extending longitudinally therealong to receive projecting key portions of the flexible hinges. The conveyor is adapted to travel between guide flanges on the head and tail rolls or oppositely disposed guide rails extending along the sides of the conveyor, and bumper elements are provided on each slat to retain the slats and hinges assembled and to slide against the associated guide member. The slats of the apron may provide a smooth supporting surface, a notched feeding surface, or a spiked feed surface.

---

The present invention relates to apron conveyors, and is particularly applicable to conveyors having metallic slats.

Slat apron conveyors have been used for many years, particularly in the textile industry and in related fields. A typical installation comprises a continuous apron of fabric or other suitable flexible sheet trained over pulleys at the opposite ends of the conveyor runs. Slats are secured to the flexible aprons by riveting or the like and may include simple strips of wood or metal extending transversely of the conveyor at spaced intervals therealong, or may include strips having upstanding spikes, usually inclined in the direction of the travel of the conveyor, particularly for advancing loose fibrous material up an incline. Another form of slat conveyor comprises a series of rigid slats interconnected in edgewise abutting relation by chain links along the opposite side edges of the conveyor or by several belts across their width. Canvas or other sheet material may be fastened across the narrow spaces between the slats. Such conveyors are driven by sprockets or pulleys at the opposite ends of the runs of the conveyor and operate similarly to the slatted apron type conveyor discussed above.

Conveyors of this type are subjected to hard usage and are frequently damaged by foreign objects which may frequently appear in batches of natural textile fibrous products, such as cotton or wool. The continuous-apron type conveyor, when damaged, must be completely replaced when it is necessary to repair the same. The chain-connected metallic slat conveyor entails considerable work when replacing damaged slats or links.

In order to facilitate replacement and repair of slat conveyors of this type, it has been proposed to employ slats of metal or other strong material having grooves extending longitudinally therealong at the opposite sides thereof in which flexible connectors are mounted in order to assemble the slats into a continuous endless apron. Such conveyors, are not entirely satisfactory since the slats of such conveyors tend to skew if there is any difference in the circumferential length at the opposite edges. Furthermore, it is difficult to maintain "tracking" of such conveyors.

With conventional conveyors having long runs between pulleys, it is possible to provide proper tracking by adjusting the tension laterally between pulleys at the opposite ends of the runs of the conveyor. In long-run flexible continuous-apron conveyors, the conveyor tends to travel to the tensioned end of the pulley and in long-run metallic link conveyors, the conveyors tend to travel toward the untensioned end of the pulley. With hinged-metallic-slat conveyors, the tracking of the conveyor is unpredictable and the proper tensioning of such conveyors must be done by regulating the pulleys individually on a trial-and-error basis.

With conventional short-run conveyors, it is possible to obtain proper tracking by using flanged pulleys to retain the conveyor against lateral displacement. However, conveyors utilizing flanged pulleys are subjected to excessive wear at the edges of the conveyor and on the flanges. For hinged metallic slat conveyors, metal wear strips may not be used because of sparking, and it is necessary to frequently replace the conveyors and flanged pulleys.

The present invention provides an improved assembly in which the conveyor comprises a series of metallic slats interconnected by flexible hinges trained over pulleys at the opposite ends of the conveyor runs and guided between guide rails extending between said opposite ends.

More particularly the present invention provides a conveyor of the stated type having bumper elements mounted on each slat at the opposite ends thereof, adapted to slidably engage against the guide rails to insure proper tracking of the conveyor.

More particularly, the present invention contemplates metallic slats having longitudinal edge grooves to receive flexible flange members extending between the slats, and bores therein which are open at the opposite ends of the slat to receive resilient bumper elements mounted therein, the bumper elements having said portions adapted to slide against the guide rails, and portions overlapping the edge grooves to retain the hinge members and resist skewing.

All of the objects of the present invention are more fully set forth hereinafter with reference to the accompanying drawings, wherein:

FIG. 5 is a fragmentary view in end elevation of the conveyor encircled at 5 in FIG. 1;

FIG. 6 is an enlarged fragmentary sectional view taken on the line 6—6 of FIG. 1;

FIG. 7 is a sectional view taken on the irregular section line 7—7 of FIG. 6;

FIG. 8 is a transverse sectional view taken on the line 8—8 of FIG. 7;

FIG. 9 is a detached perspective view showing the end of a metallic slat and a bumper element of the conveyor shown in FIGS. 6 to 8 inclusive; and FIG. 10 is an enlarged perspective view, as seen from the rear of the bumper element shown in FIG. 9.

Figure 1:
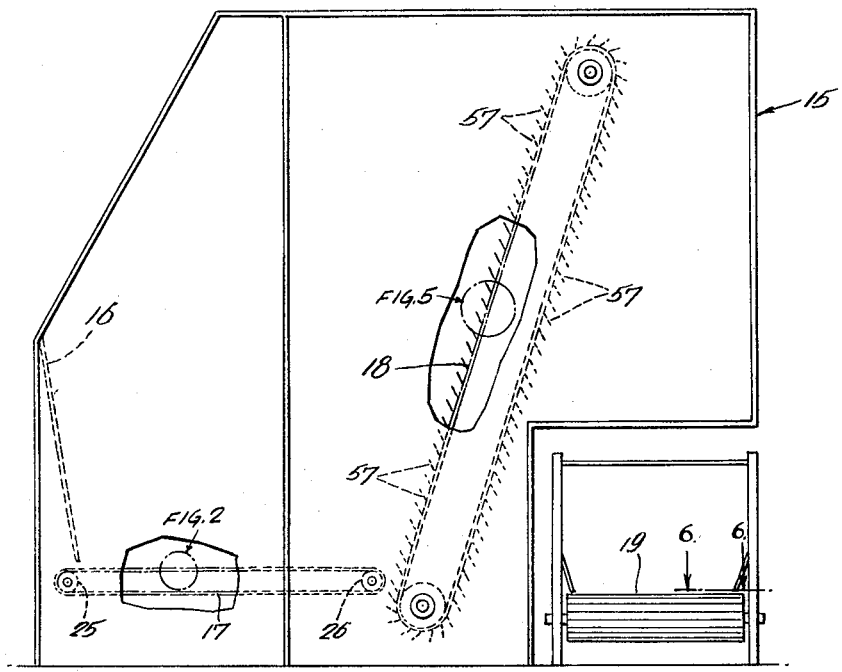
FIG. 1 is a view in side elevation with portions broken away of a feed unit for textile material embodying conveyors made in accordance with the present invention.

Referring now to the drawings, and particularly FIG. 1 thereof, a feed unit for textile material is shown schematically at 15. The illustrated unit includes a supply bin 16 having at its bottom a carry-in apron conveyor 17 made in accordance with the present invention. This conveyor 17 carries the material deposited in bin 16 onto an inclined spike apron conveyor 18 which carries the material upwardly. Adjacent the top of the conveyor 18, the material is stripped from the conveyor and is weighed and discharged by a weighing mechanism (not shown) onto a blending apron conveyor 19. A blending apron conveyor, such as the conveyor 19, is conventionally common to a plurality of weighing feed apparatus so as to receive a plurality of superposed layers of material in succession. Apparatus of this nature is shown in detail in U.S. Patent No. 3,212,673, which issued to Edward M. Hyde on Oct. 19, 1965.

Figure 2:
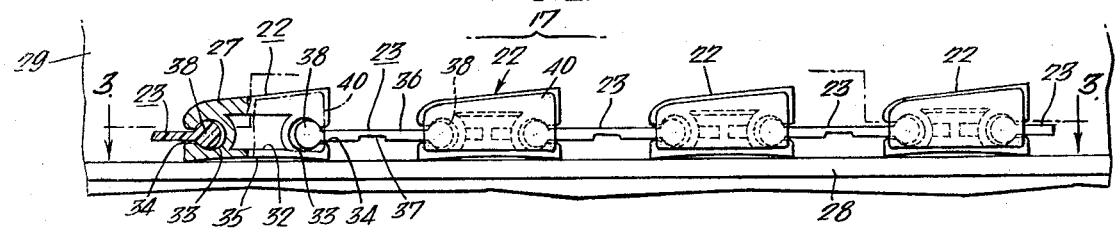
FIG. 2 is a fragmentary view in end elevation of the conveyor encircled at 2 in FIG. 1.
Figure 3:
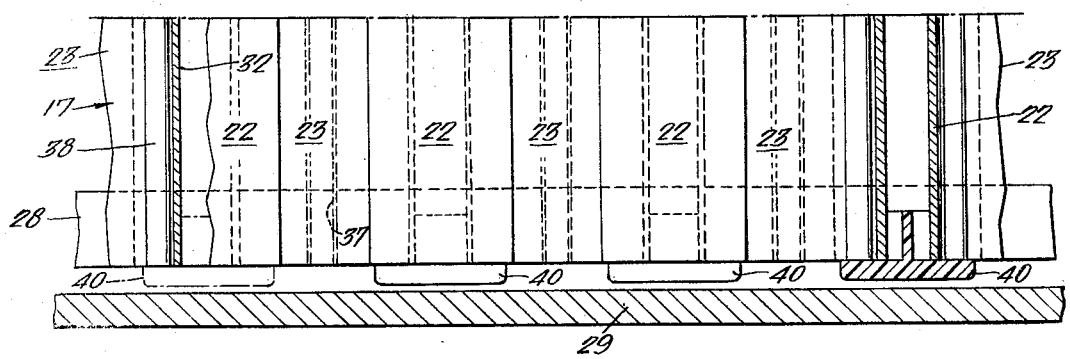
FIG. 3 is a transverse sectional view taken on irregular section line 3—3 of FIG. 2.
Figure 4:
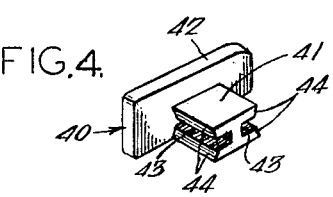
FIG. 4 is a detached perspective view of a bumper element for the slats shown in FIGS. 2 and 3.

Referring now to FIGS. 2–4, the carry-in conveyor 17 comprises a plurality of slats 22 interconnected by hinge elements 23 to form an endless apron trained over end pulleys 25 and 26 which are driven in the conventional manner. Intermediate the pulleys 25 and 26, the slats 23 are slidably supported by runners 28 preferably formed of wood or similar non-abrasive material, which prevent sagging of the apron intermediate the pulleys 25 and 26. Guide rails 29 are provided along the opposite sides of the conveyor apron to assist in the tracking of the conveyor, preventing substantial undesired lateral displacement thereof. It may be preferred to use flanged pulleys, the flanges of which may serve as guide members to assist in the tracking of the conveyor.

In accordance with the invention, the slats 22 are preferably formed of a durable light weight material, aluminum being typical because of the ease in forming extrusions thereof. The upper surface 27 of the slats declines from one end to the other so as to provide an overall notched exposed surface to the apron formed by the slats and hinges. Each slat 22 has a longitudinal bore 32 therein extending from end to end centrally therein. Along each side edge, a longitudinal edge groove is formed of keyhole shape, having an enlarged inner portion at 33 and a restricted slot at 34. The bottom surface of each slat may be flat, or may be arcuate as indicated at 35 to conform to the contour of the pulleys 25 and 26.

The hinge elements 23, in the present instance, comprise resilient flexible strips of wear-resistant plastic, such as polypropylene, having a body portion 36 with a central section at 37 to permit flexing. The body portion terminates at its opposite sides in enlarged cylindrical beads 38 adapted to engage in the enlarged inner portion 33 of the longitudinal edge grooves of the slat 22, the body portion 36 being received in the restricted slots 34. The hinge members 23 are co-extensive in length with the slat 22 so that the assembly thereof provides a substantially continuous apron.

In assembly of the apron, the hinge members are telescopically engaged longitudinally into the edge grooves of the slat members 22 to form an endless apron. The dimensions of the grooves are sufficiently greater than the dimensions of the hinges to provide easy sliding displacement of the hinges into the slats. In this manner, the apron may be readily disassembled by simply displacing one of the hinge members from engagement with its associated slat, or by displacing one of the slats from engagement with its associated hinges, thereby enabling ready removal and replacement of damaged slats or hinges.

To prevent inadvertent disassembly of the apron and, at the same time, limit skewing of the slats and hinges, means is provided to close the edge grooves at their opposite ends after engagement of the hinges therein. To this end, a bumper element 40 is mounted on each slat 22. As shown in FIG. 4, the bumper element 40 comprises a shank portion 41 which is adapted to be frictionally engaged in the bore 32, and a head portion 42 which covers the end of the slat 22 including the ends of the grooves 33. The projecting head portion 42 also serves as a guiding element for the conveyor, the projection thereof affording sliding engagement of the bumper element with the guide rails 29 at the opposite ends of each slat. To assure the frictional engagement of the shank 41 in the bore 32, the side edges of the shank are grooved as indicated at 43 so as to increase the resiliency of the shank, and the side walls of the shank converge inwardly toward the groove as indicated at 44, thereby providing a firm resilient frictional engagement of the shank 41 in the bore 32. The material of the bumper is wear-resistant and is sufficiently resilient to accommodate any impact of the conveyor against the guiding rails 29, while insuring firm frictional engagement of its shank in the bore of the slat.

As shown in FIG. 5, the conveyor 18 is constructed similarly to the conveyor 17. In this instance, the conveyor 18 includes metallic slats 52 which are interconnected by hinge members 53. The slats are supported on runners 58 and are guided between guide rails 59 on the opposite sides of the conveyor.

The slats 52 have a central longitudinal bore 62 and laterally open edges grooves having an enlarged inner portion 63 and a slot 64 similar to the portions 33 and 34 of the slat 22, so as to receive the enlarged edge portions 68 of the hinges 53, which may be identical to the hinges 23, or may take a form shown in FIG. 5 wherein the edge beads 68 are wedge-shaped and are interconnected by a uniform body portion 69 which is sufficiently thin to permit flexing. The wedge form of the edge beads provides firm frictional engagement and resists sliding and consequent apron skewing. The bottom surface 65 of the slat is arcuate and the upper surface is provided with a series of upwardly inclined spikes 57 along its entire length for carrying this fibrous stock upwardly thereon. Bumper elements 70 are engaged in the bores 62 having enlarged heads 72 adapted to retain the slats and hinges assembled and to engage against the guide rails 59. The bumper elements 70 are constructed similarly to the elements 40.

The blending apron conveyor 19 is of the same general construction as the conveyors 17 and 18. As shown in FIGS. 6 to 10, the conveyor 18 includes a plurality of metallic slats 82 interconnected by hinge members 83. The conveyor 18 is supported on runners 88 between guide rails 89 disposed on the opposite sides of the conveyor.

In the present instance, the slats 82 have an arcuate upper surface 84 which is convex and an arcuate lower surface 85 which is concave to conform to the contour of the drive pulleys. The slats are hollow, having a longitudinal bore 92 and edge grooves having an enlarged inner portion 93 and a restricted slot 94 opening to the edges. It is noted that the side walls 86 of the bore 84 have a curvature concentric with the cylindrical enlarged portion 93 of the edge grooves. The slats are assembled with the hinge members 83 which are similar to the hinge members 23, with enlarged edge portions 98 which engage in the enlarged portions 93 of the edge grooves.

The slats and hinges are held in assembled relation by bumper elements 100 having a shank 101 adapted to engage in the bore 92 and an enlarged portion 102 adapted to overlie the ends of the grooves 93. In he present instance, the head portion 102 has an arcuate upper edge conforming to the curvature of the upper surface 84 of the slat 82 so as to close the bore 92. The shank 101 is one similar to the shank 41 with lateral grooves 103 and inwardly converging edges 104. By this construction, the sides of the shank 101 engage firmly against the arcuate sides 86 of the bore 92 so as to be retained therein by firm frictional engagement.

From the foregoing description, it is apparent that the present invention provides a conveyor assembly which is readily manufactured from extrusions, both the metallic slats being of a form which is readily extruded and the flexible hinge members being of a likewise easily-extrudable form. The bumper members may be molded by conventional molding techniques and the assembly of the conveyor is readily accomplished in the field with a minimum use of tools or other special equipment. The parts are interchangeable and the conveyor aprons of the present invention may be readily substituted for conventional aprons which have become damaged or worn out.

Thus, the present invention provides a fully effective and efficient conveyor assembly which may be manufactured, installed and maintained economically.

While particular embodiments of the present invention have been herein illustrated and described, it is not intended to limit the invention to such disclosure but changes and modifications may be made therein and thereto within the scope of the following claims.

The embodiments of the invention in which an exclusive property or privilege is claimed are defined as follows:

1. A conveyor assembly for particulate material comprising a conveyor apron formed of a series of slats of rigid material interconnected by flexible hinge members, runners underlying said apron adapted to slidably support the slats in their travel, pulleys at the opposite ends of said runners for advancing the apron therealong, and guide means disposed along opposite sides of said conveyor apron to limit lateral displacement of said apron relative to said runners, said slats having a central bore extending longitudinally thereof and open at each end, and edge grooves extending continuously from end to end having an enlarged portion communicating with a restricted slot open along the entire edge of the slat;

said hinge members comprising elongated flexible strips having a body portion adapted to slidably engage in said slots and enlarged edge portions adapted to slidably engage in said enlarged portions of said edge grooves; and a bumper member having a stem engaged in said hollow bore and an enlarged head portion projecting outwardly therefrom to overlie the ends of said edge grooves, said head portion being of wear-resistant material and adapted to slidably engage said guide means to retain said apron in position intermediate said guide means overlying said runners.

2. A conveyor assembly according to claim 1 wherein said metallic slats are of extruded aluminum and said central bore extends continuously therethrough.

3. A conveyor assembly according to claim 1 wherein said hinge member is an extruded plastic material, the body portion of said hinge members is of a thickness to provide flexing thereof intermediate said elongated edge portions to provide a hinge.

4. A conveyor according to claim 1 wherein said enlarged edge portions of the hinge members are cylindrical.

5. A conveyor according to claim 1 wherein said enlarged edge portions of the hinge members are wedge-shaped.

6. A conveyor assembly according to claim 1 wherein said bumper element comprises a resilient wear-resistant plastic, said stem having grooves in the opposite edges thereof affording frictional engagement of said stem in said bore.

7. Conveyor assembly according to claim 1 wherein said metallic slats have arcuate under surfaces conforming to the contour of the pulleys.

8. A conveyor assembly according to claim 1 wherein said slat is thicker along one edge than along the other to provide an inclined upper surface thereon which provides a notched upper surface to the conveyor apron.

9. A conveyor assembly according to claim 1 wherein said metallic slat includes a series of upwardly inclined spikes projecting upwardly therefrom along the entire length thereof.

10. A conveyor assembly according to claim 1 wherein said metallic slats have an upwardly convex upper arcuate surface.

References Cited

UNITED STATES PATENTS

| 3,262,549 | 7/1966 | Stewart et al. | 198—195 |
| 3,349,893 | 10/1967 | Jordan et al. | 198—195 |

FOREIGN PATENTS

| 663,106 | 12/1951 | Great Britain. |

EVON C. BLUNK, Primary Examiner

R. S. GAITHER, Assistant Examiner

U.S. Cl. X.R.

198—137